United States Patent [19]

Sprung

[11] Patent Number: 5,001,859
[45] Date of Patent: * Mar. 26, 1991

[54] METHOD AND STRUCTURE FOR ENVIRONMENTAL CONTROL OF PLANT GROWTH

[76] Inventor: Philip D. Sprung, c/o 1001 - 10th Avenue SW., Calgary, Alberta, Canada, T2R 0B7

[*] Notice: The portion of the term of this patent subsequent to Dec. 6, 2005 has been disclaimed.

[21] Appl. No.: 947,636

[22] Filed: Dec. 30, 1986

[51] Int. Cl.$^5$ ............................................. A01G 9/00
[52] U.S. Cl. ................................... 47/17; 47/26; 47/48.5; 52/1; 52/222
[58] Field of Search ..................... 47/17, 18, 48.5, 19; 52/222, 1, 97

[56] References Cited

U.S. PATENT DOCUMENTS

| | | | |
|---|---|---|---|
| 3,016,801 | 1/1982 | Michel | 47/17 |
| 3,080,875 | 3/1963 | Bartlett | 47/17 |
| 3,807,088 | 4/1974 | Jones | 47/1.2 |
| 4,137,687 | 2/1979 | Sprung | 52/222 |
| 4,149,970 | 4/1979 | Atkins et al. | 47/62 |
| 4,163,342 | 8/1979 | Fogg et al. | 47/17 |
| 4,195,441 | 4/1980 | Baldwin | 47/17 |
| 4,198,783 | 4/1980 | Leroux | 47/60 |
| 4,250,661 | 2/1981 | Kodero et al. | 47/17 |
| 4,352,256 | 10/1982 | Kranz | 47/17 |
| 4,366,646 | 1/1983 | Pratt | 47/17 |
| 4,430,828 | 2/1984 | Oglevee et al. | 47/17 |
| 4,587,159 | 5/1986 | Gutek | 428/251 |
| 4,788,791 | 12/1988 | Sprung | 47/17 |

FOREIGN PATENT DOCUMENTS

| | | | |
|---|---|---|---|
| 1097075 | 3/1981 | Canada | 47/62 |
| 0038213 | 10/1981 | European Pat. Off. | |
| 0142989 | 5/1985 | European Pat. Off. | |
| 0197398 | 10/1986 | European Pat. Off. | |
| 1230351 | 9/1960 | France | |
| 2446591 | 9/1980 | France | 47/17 |
| 0060439 | 8/1985 | Japan | 47/17 |
| 1443517 | 7/1976 | United Kingdom | |
| WO86/06928 | 12/1986 | World Int. Prop. O. | |

OTHER PUBLICATIONS

The Textile Manufacturer, vol. 97, No. 1161, Aug./Sep. 1971, p. 329.

Primary Examiner—Randolph A. Reese
Assistant Examiner—Jeffrey L. Thompson

[57] ABSTRACT

A method and structure for environmental control of plant growth in greenhouse conditions. The structure comprises a translucent stressed fabric shell on a base, the shell and base enclosing a predetermined space within which to grow horticultural plants, the shell and base sealing the environment within the space against external environmental air conditions. Temperature, humidity carbon dioxide are monitored and controlled within the space by a microprocessor programmed to provide optimum temperature, humidity and carbon dioxide conditions within the space. The structure and method are ideally suited to nutrient film techniques, wherein nutrient being fed to the plant roots is monitored and controlled by the microprocessor.

24 Claims, 5 Drawing Sheets

METHOD AND STRUCTURE FOR ENVIRONMENTAL CONTROL OF PLANT GROWTH

BACKGROUND OF THE INVENTION

This invention relates to a method and apparatus for environmental control of plant growth, and more particularly to a method and structure for growing plants in harsh environmental conditions.

Traditional greenhouse structures, consisting of transparent panes of glass forming a roof to enclose a growing area, drawing air from the outside and having a heater for winter months, while adequate for many purposes, possess many shortcomings which make them unsuitable for year-round production of many types of fruits and vegetables in certain climatic conditions, e.g. in far Northern or far Southern climates where temperature and light conditions may be poor. In addition, because such greenhouses often are not well sealed against the outside environment, unsuitable temperature differentials may be created within. As well, outside air which may contain substances which are not conducive to proper growth of plants, is permitted to enter. Also, by-products from the heater system, which often is a natural gas or oil furnace may be present in the environment within such greenhouses again causing reduced plant growth. The water which is used in such greenhouses is often local water and again may contain impurities or compositions which impede plant growth. There is an increasing awareness of the detrimental impact of impurities in the air or water on plant growth. In addition, the concentration of elements required for plant growth such as calcium, nitrogen and phosphorous in water being fed to plants in conventional greenhouses may change from day-to-day, resulting in irregular plant growth.

As a result, in recent years there has been a trend towards development of controlled environment horticultural or agricultural installations. For exampl, Canadian Patent No. 1,097,075 of Miller issued March 10, 1981 describes and illustrates a nutrient supply system for such a controlled environment agricultural installation incorporating nutrient film techniques in which plant root masses are arranged to be wetted by contact with a small stream of liquid nutrient. Capillary attraction or wicking then is relied upon to extend the nutrient-wetted area over and through the entire root mass. Nutrient supply is achieved by positioning the plant roots in long troughs and flowing thin stream of liquid nutrient along the bottom of the trough permitting the stream to contact each of the plant root masses as it flows along. Excess nutrient is recycled usually after any needed replenishment of its compositional elements.

Such attempts in a greenhouse to control the various conditions responsible for plant growth have, heretofore been extremely limited in scope. Thus, for example, in Miller Canadian Patent No. 1,097,075, only the nutrient feed is controlled. In Canadian Patent No. 982,426 of Delano et al issued Jan, 27, 1976, a method of controlling the amount of solar heat and light which enters a glass or plastic greenhouse is described wherein a liquid is coated on the glass or plastic film of the greenhouse. The liquid dries into a coating which is transparent under certain conditions and non-transparent under other conditions. In Canadian Patent No. 955,748 of Glatti et al issued Oct. 8, 1984, the light passing through a translucent covering of a greenhouse is partially controlled by coating the inner surface of the translucent covering with a surface-active agent, which surface-active agent reduces the contact angle of water-condensate droplets formed on the inner surface thereof to below 75°.

Other patents of general background interest describing different types of greenhouse structures include U.S Pat. No. 4,195,441 of Baldwin issued April 1, 1980 (solar greenhouse in which plants are used as solar collectors to absorb solar radiation and store it in a heat reservoir beneath the greenhouse) and U.S. Pat. No. 4,352,256 of Kranz issued Oct. 5, 1982 (greenhouse structure including a central hub and arms comprising growth chambers extending radially outwardly therefrom).

While previous attempts to provide controlled environment horticultural installations have apparently been successful for the limited purposes for which they were developed, attempts to provide a comprehensive controlled environment horticultural installation and method in which all or most of the environmental factors required for proper plant husbandry are controlled has not as yet been developed. It is an object of the present invention to provide such an installation and method.

More particulary, it is an object of the present invention to provide a structure and method for the production of horticultural crops, in which, inter alia, temperature, relative humidity, carbon dioxide and other factors essential for proper Plant growth are monitored and controlled.

It is a further object of the present invention to provide a controlled environment horticultural installation which will permit large scale production of horticultural crops even in external environmental conditions which are normally detrimental to plant growth and horticultural production.

SUMMARY OF THE INVENTION

According to the present invention there is provided a controlled environment structure within which to grow horticultural plants. The structure comprises a translucent impermeable stressed fabric shell on a base. The shell and base enclose a predetermined space within which horticultural plants are to be grown. The shell and base seal the environment within the space against external environmental air conditions. Temperature monitor and temperature control means, humidity monitor and humidity control means and carbon dioxide monitor and carbon dioxide control means are provided for the space. Microprocessor control means are electronically associated with the temperature monitor and control means, humidity monitor and control means and carbon dioxide monitor and control means and programmed to provide optimum temperature, humidity and carbon dioxide conditions for the plants being cultivated in the space.

In a preferred embodiment of the present invention, the structure further comprises plant root nutrient monitor means and plant root nutrient control means for plants grown within the space. The microprocessor means is electronically associated with the plant root nutrient monitor and control means and is programmed to provide optimum nutrient concentration conditions for nutrient solution being fed to the roots of the plants being cultivated in the space.

In accordance with the method according to the present invention, plants are grown in a sealed environment within a translucent stressed fabric shell on a base. The environment within the space is sealed against external environmental air conditions, and the temperature, humidity and carbon dioxide conditions within the space are controlled to ensure that optimum conditions for plant growth are maintained.

The structure and method according to the present invention provide a controlled environment horticultural installation which permits large scale horticultural production over increased periods of time even at low solar angles such as experienced in winter time in Canadian cities such as Calgary or Northern United States cities such as Minneapolis or Seattle. Increased plant growth including increased yields of fruit and vegetables are achieved. In addition the invention provides the ability to control the internal environment of the structure to permit the year round growth of crops which could not otherwise grow in the natural environment at a particular location, even in traditional greenhouse structures. While the control and monitor systems for the various environmental factors may present costs which are greater than those which would be incurred for a conventional greenhouse without such systems, the increased yields from crops grown in such controlled environment conditions and the increased concentration of crops which can be grown tend to more than offset the increased costs. Also because of the sealed environment within which the crops are grown, herbicides and pesticides become virtually unnecessary.

BRIEF DESCRIPTION OF THE DRAWINGS

These and other objects and advantages of the invention will become apparent upon reading the following detailed description and upon referring to the drawings in which.

Figure 1:
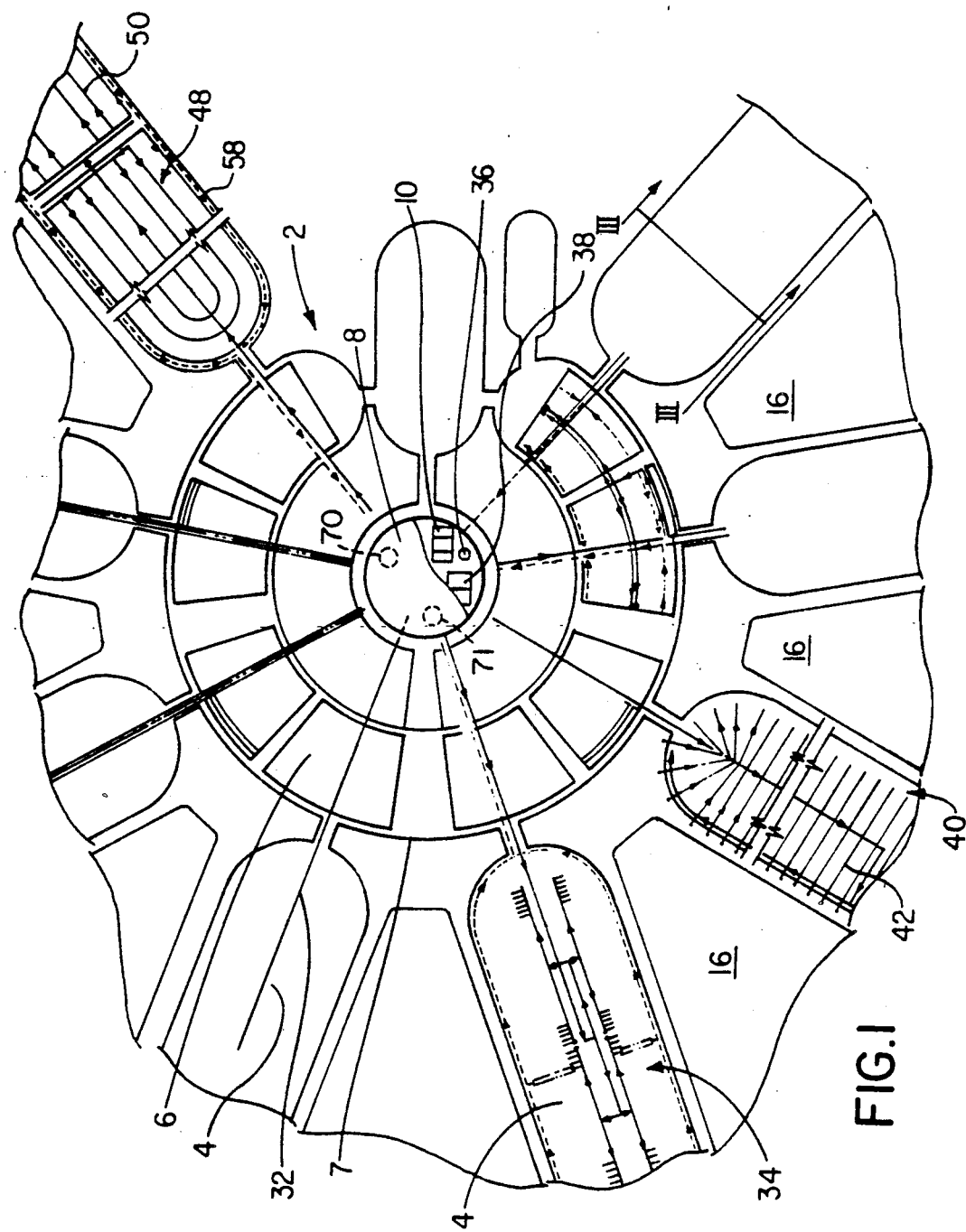
FIG. 1 is a partial schematic plan view of a controlled environment structure in accordance with the present invention, illustrating several of the control and monitor systems incorporated in such structure.

While the invention will be described in conjunction with an example embodiment, it will be understood that it is not intended to limit the invention to such embodiment. On the contrary, it is intended to cover all alternatives, modifications and equivalents as may be included within the spirit and scope of the invention as defined by the appended claims.

DETAILED DESCRIPTION OF THE INVENTION

In the drawings, similar features have been given similar reference numerals.

Turning to FIG. 1 there is illustrated a partial schematic plan view of a structure 2 in accordance with the present invention, illustrating many of the features of the structure which permit the control of the environment within elongated, radially positioned production areas 4 and immature crop development areas 6 in central annular corridor 7 of structure 2. In addition, structure 2 has a central control area 8 where a microprocessor 10, the function of which will be described in more detail hereinafter, is located. Each production area 4 is connected as illustrated to central corridor area 7 and may be sealed from the corridor and other production areas, for example to maintain differing aerial environments from one production area 4 to another which differing crops may require.

The production and immature crop development areas 4 and 6 are enclosed by a translucent impermeable stressed fabric shell 12 (FIG. 3) situated on a base 14, the shell and base enclosing predetermined spaces (e.g. production areas 4 or immature crop development area 6). Shell 12 is preferably made of a technically woven polyvinyl chloride coated polyester scrim fabric. with about a 95% light translucency. Such a fabric is highly effective in providing natural light inside the structure and is heat conductive. The fabric is preferably lightweight (e.g. 18 ounces per square yard) and flame resistant, as well as resistant to oil, chemicals, greases, rot, mildew and certain types of bacteria which attack polyvinyl chlorides and which are prevalent in a moist environment. It is preferably held between arched rib members 15 which rest on the base, the rib members being spread to tension the fabric for example as described in my U.S. Pat. No. 4,137,687 issued Feb. 6, 1979.

Figure 3:
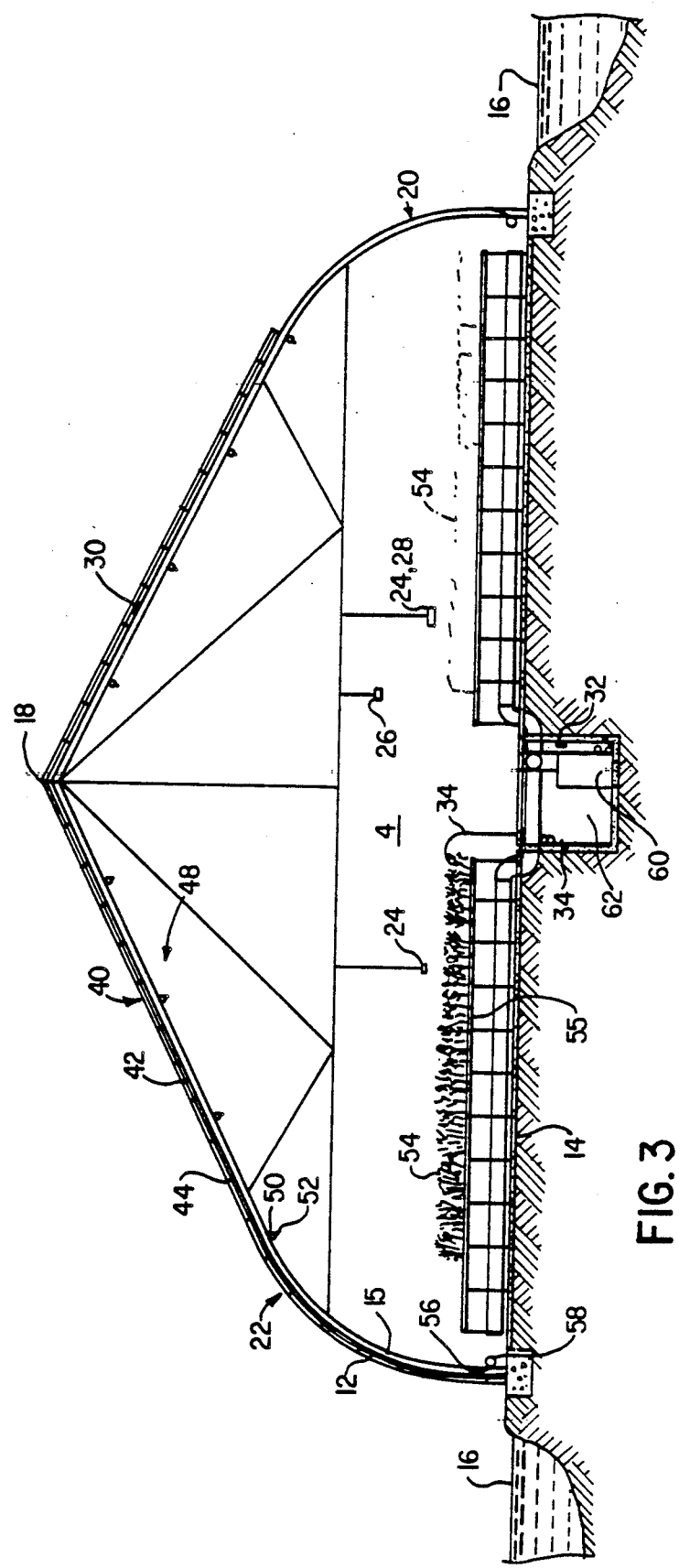
FIG. 3 is an elevation section view along line III—III of FIG. 1, through one of the production areas.
Figure 4:
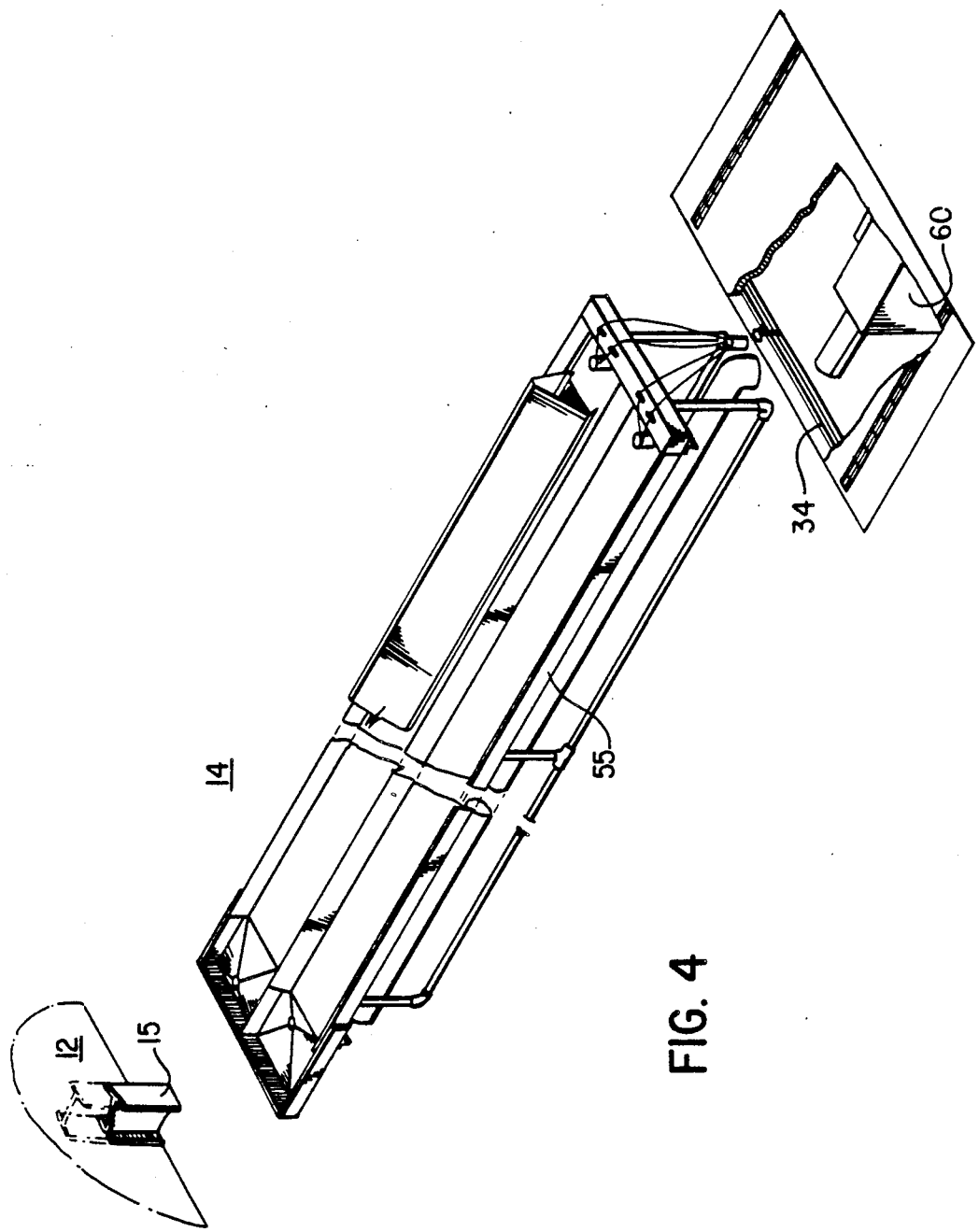
FIG. 4 is a partial perspective view of a portion of the nutrient delivery system of the structure.

In addition, as can be seen in FIG. 3, the delivery of light to the interior of the structure is further enhanced by the fact that there are very few pipes, waterlines or other physical obstructions allowed above the growing root area. Also, as illustrated in FIG. 3 base 14 for production area 4 is elevated and preferably surrounded by reflective surface 16, which may be a light coloured surface e.g. of reflective plastics, or, water ponds as illustrated, ice surfaces (in below- freezing temperatures) or the like. In this manner, even when there is a low solar angle, light is transmitted by reflection, as well as directly, into the structure through shell 12. As can be seen in FIG. 3, the sides which make up shell 12 extend upward, from base 14, in convex fashion and meet at crest 18, forming two sides 20 and 22 for the shells of each of the elongated production areas 4.

The shells 12 extend over corresponding bases 14 of each of the areas illustrated in FIG. 1 to seal the environment within such areas against external environmental air conditions. This is an important aspect of the invention since it makes possible the close control of environmental conditions within each of the areas of the structure, such as humidity and carbon dioxide concentration. Otherwise, this would not be possible.

A series of temperature monitors 24, carbon dioxide monitors 26 and relative humidity monitors 28 are provided for the interior atmosphere within each of the production areas 4 and immature crop development areas 6 in question (FIG. 3). As well, in the shell covering each of the areas 4 and 6 are embedded temperature sensors 30. Carbon dioxide delivery systems 32 and nutrient delivery systems 34 (FIG. 1), the systems delivering respectively carbon dioxide and nutrient solution from sources preferably located in central control area 8 are provided for each of the production areas 4 and immature crop development areas 6, although these are illustrated as being in separate areas 6 in FIG. 1 merely for ease of illustration. Microprocessor 10, electronically connected to monitors 24, 26, 28 and 30, controls the delivery of carbon dioxide from a source 36 and nutrient from reservoir tanks 38 in central control area 8 to areas 4 and 6.

Figure 2:
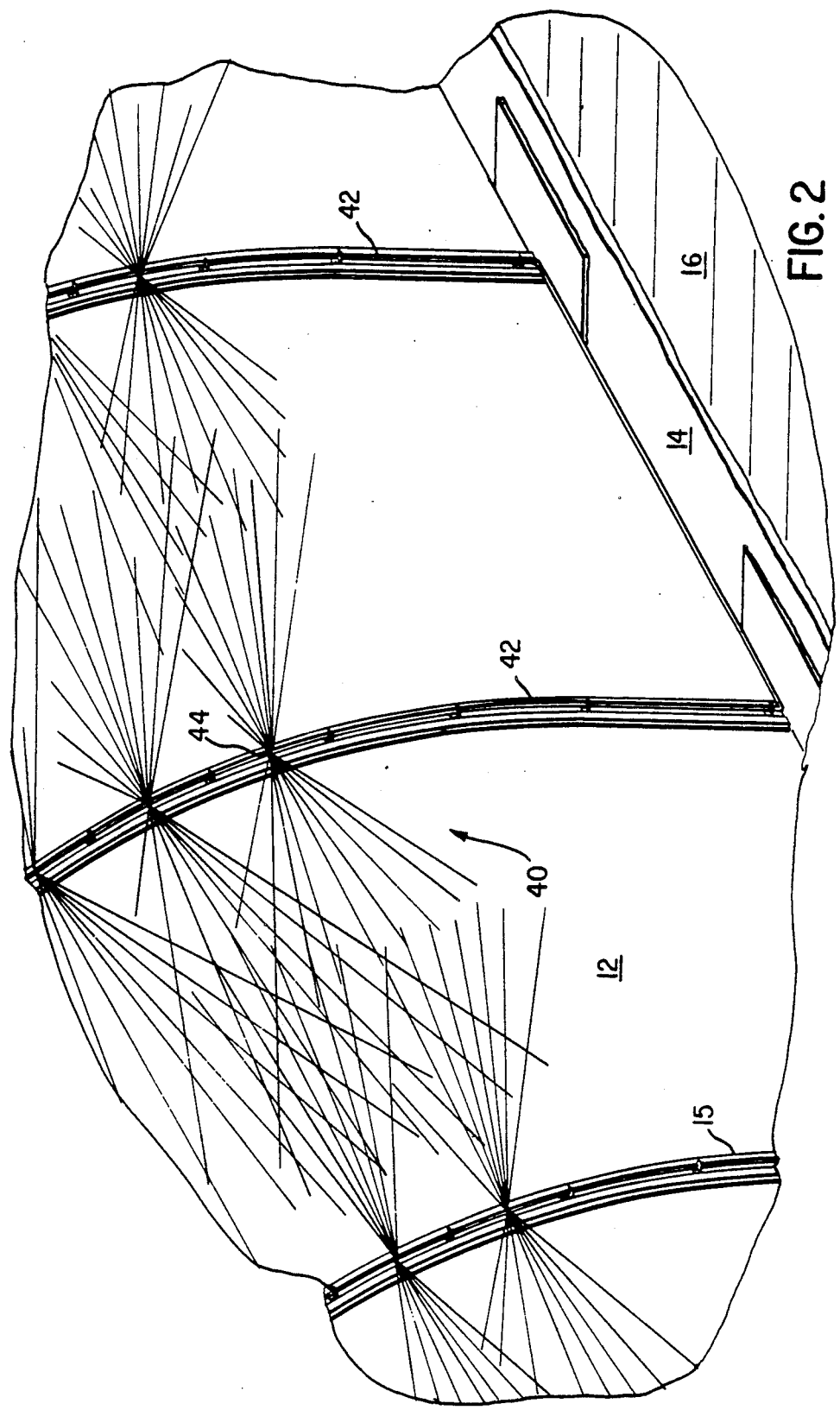
FIG. 2 is a partial, perspective view of an external spray system for controlled spraying of a film of water over the external surface of the shell of the structure according to the present invention.

The temperature and relative humidity within each of the production areas 4 and immature crop development areas 6 is controlled by a sophisticated and sometimes interrelated series of systems. First of all, for temperature control, each of the shells over production areas 4 and immature crop development areas 6 is provided with an external spray system 40 (FIG. 2) consisting of a series of pipes 42 supplying water which may be, for example from a source (not shown) in central control area 8 or from ponds 16, and feeding the water through these pipes to spray nozzles 44 (FIG. 2) to spray a thin film of water over the exterior surface of shell 12 to cool it as required. To achieve this end the water is first sprayed from nozzles 44 through the air and onto the exterior of shell 12 into a dispersed pattern as illustrated. This spraying through the air provides for evaporative cooling of the water, thereby supplying additional cooling potential to shell 12. Sensors 30 in shell 12 are electronically connected to microprocessor 10 and, either on a timed sequence or as the temperature of the shell builds up to a certain range, it activates solenoid valves (not shown) to cause water to be sprayed through nozzles 44 over exterior surface of the shell to cool it. The shape of shells 12 over production areas 4 and immature crop development areas 6 is such that this water film will run down the exterior surface of the shells. Nozzles 44 are preferably directed to provide an even spray over most of the exterior surface of shell 12 over production areas 4 and 6, as required. Water so sprayed over shells 12 may be collected, for example, in the external ponds 16 forming the reflective surface, or by any other appropriate retrieval means.

Internally, temperature control is achieved through internal mist generation system 48 (FIG. 3) which comprises water supply pipes 50 feeding fog nozzles 52, which nozzles produce, as required, a fine mist or cloud in the atmosphere in the space over plants 54. This internal mist generation system is activated by temperature monitors 24 electronically connected to microprocessor 10, which microprocessor activates the internal mist generation system when the temperature within the immature crop development or production area exceeds a predetermined level or on a timed sequence. The production of the mist or cloud causes cooling in two ways. Firstly, it impedes the passage of rays of sunlight to the plants thereby cooling by shading. Secondly, as the mist or cloud evaporates under the heated conditions within the shell, the evaporation draws heat from the environment in the space in the shell. The evaporated water vapour condenses on the cooler shell surface (cooled if necessary by external vapour system 40), Passing the heat of condensation into the shell fabric. The shell fabric is of a heat conductive material and heat is thereby passed from the internal to the external side of the shell and out of the internal environment of production area 4 or immature crop development area 6.

Figure 5:
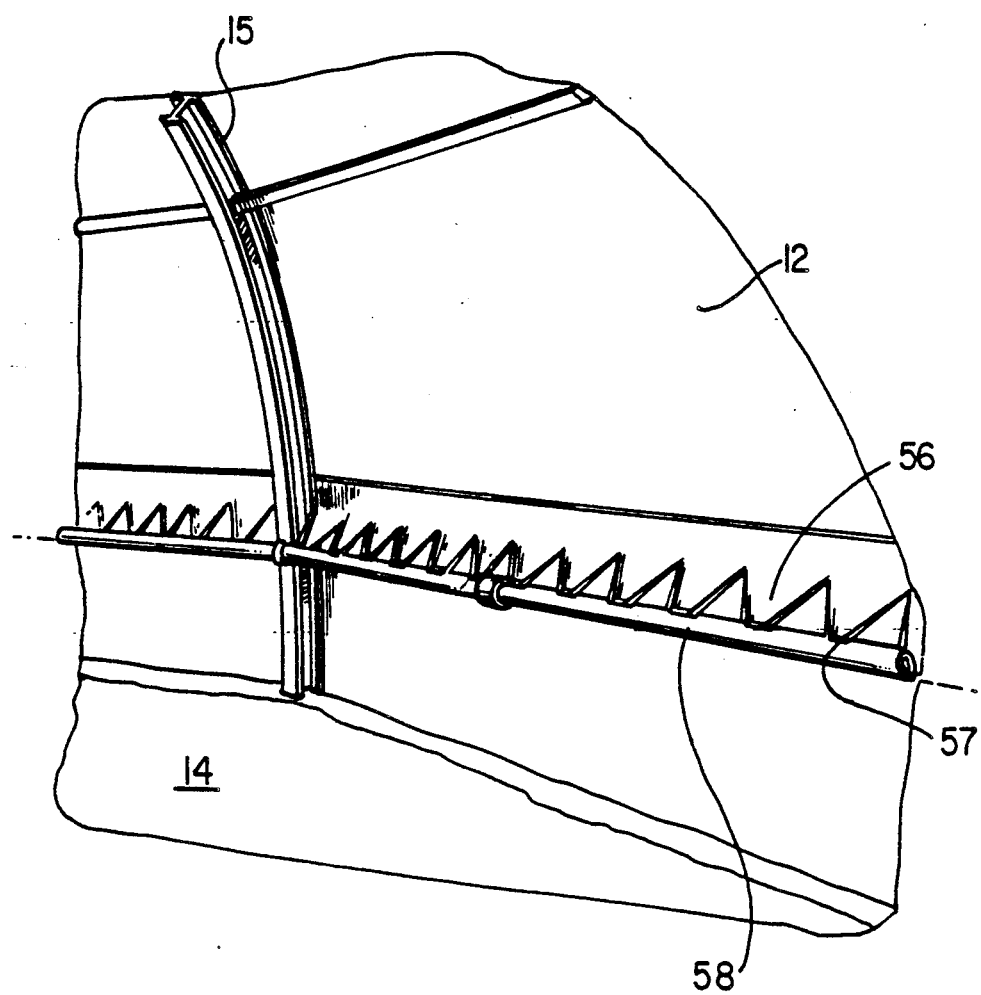
FIG. 5 is a partial perspective view of the interior of one of the shells of the structure of FIG. 1 illustrating the water collection system for the interior surfaces of the shell of the structure.

Water vapour thus condensing on the interior surface of shell 12 (which may include water vapour from transpiration of the plants 54) travels down the sides of the shell and is collected by means of collection skirts 56 passing into slots 57 in collection pipes 58 (FIG. 5), collection pipes 58 returning this condensed water to a central location where it may be used as required, prefera)y being mixed with nutrient in tanks 38 (FIG. 1). This system thus acts as a large scale water distillation system, the water received by the plants in solution with the nutrient having been purified by means of this distillation process.

As well, as one can imagine, one of the problems of adapting a greenhouse structure in which the internal environment is sealed against external environmental air conditions, when applied to large scale production from crops within the greenhouse, is the build up of water vapour in the air. This build up results from transpiration from the plants. If it is permitted to continue unchecked, the relative humidity in the greenhouse structure will build up to the point that transpiration of the plants is significantly impeded. As plants require transpiration for example to cool their leaves and to draw nutrient solution through the plant system, the growth of the plant is thus adversely affected. While the structure could be opened to the outside environment to permit the humidity which has become built up within the structure to escape, this may create unwanted temperature differentials within the greenhouse structure and be quite impractical, for example in winter conditions. It will be readily understood, therefore, that the condensation of water vapour on the interior surface of shell 12 and the removal of that condensed water by means of collection skirts 56 and collection pipes 58 helps to control the humidity conditions within the greenhouse structure so that proper transpiration of the plants is continuously permitted without requiring the greenhouse structure to be opened up to the outside environment.

The cooling of the areas 4 and 6 is most important because of the tremendous heat build up which occurs in such areas during solar radiation of structure 2 particularly during summer, spring and fall months. During winter or cool external conditions however, where heating is required, that heating is provided by appropriate furnaces 60 (FIG. 3). These may be gas, oil or electric preferably. Again, in order to minimize obstructions to light passing to plants 54, these furnaces are positioned in basement channel 62 below the floor of base 1 (FIG. 3).

Humidity conditions within each of the areas 4 and 6 may also be controlled by microprocessor 10 as required, as dictated by relative humidity sensors 28, by passing water through supply pipes 50 and passing it into the atmosphere as cloud or mist through fog nozzles 52. Alternatively separate sets of supply pipes or valves may be used for controlling relative humidity.

It will be understood that nutrient delivered through nutrient delivery system 34 is passed to trays 55 in which sit the roots of plants to be grown (in production areas 4) or inert blocks of seeds or seedlings (immature crop development areas 6). As is conventional in the art, excess nutrient not required by the plants, seeds or seedlings is collected and returned to nutrient tank 34. Thus it is preferred to slope base 14. Particularly in each production area 4 downwardly from the centre towards the sides and from the outer ends to the inner ends to facilitate collection of excess nutrient and water from these areas.

Because of the computerized control of the various aspects of the internal environment in production areas 4 and immature crop development areas 6, nutrient concentrations, carbon dioxide concentrations, relative humidity and temperature may be adjusted to suit the particular type of plant being grown or the stage of growth of that plant. Microprocessor 10 may be appropriately programmed to modify these environmental conditions for the plants over the life of the plants, to ensure optimum plant growth. As well, it is preferred to provide an appropriate alarm means 70 (FIG. 1) so that when such environmental conditions exceed a desired range for proper plant growth, the alarm will sound and, if required, a manual override and manual adjustment of such conditions may take place.

It is preferred that any outside air required for operation of the structure in accordance with the present invention be appropriately purified prior to its introduction into the environment within production areas 4 or immature crop development areas 6. As well, means 72 (FIG. 1) to provide further purification of water introduced inside the structure, such as ultraviolet radiation and chlorination, may be incorporated.

COMPARATIVE TESTING

In experiments conducted growing tomatoes and cucumbers in accordance with the present invention, in Calgary, Alberta, Canada, significantly improved results including continuous production, higher densities and faster growth during winter months over traditional greenhouse technology have been achieved. Indeed, before the present invention, mass production of such vegetables during winter months at such a latitude had been unknown.

Compared with conventional greenhouse systems, the controlled environment system according to the present invention permits a production line (e.g. Alpha production units) which will produce for a peak production period. As this period phases out, a neighbouring production line (Beta production unit) enters its peak production period. The Alpha line is then removed and replaced with a young Alpha Production line which will come into peak p roduction as Beta production line phases out. This rotation allows for continuous peak production 365 days a year. Conventional systems, while sometimes having two production lines, do not allow for continuous production from the lines, a gap in production occuring between the termination of production of one line and the commencement of production of the other. As well, the production cycle is not for the peak period but rather for a much longer cycle. Production over the year is not 365 days a year. Several months are non-productive periods, particularly during winter months.

In addition, for example with cucumbers, applicant's system permits higher density production. Cucumbers for example may be grown in a 1.75 square foot spacing whereas, with conventional greenhouse nutrient feed systems, that spacing is 6 square feet at the latitude in question.

As for faster growth, over a period of Jan. to May, cucumber plants grown in accordance with applicant's invention have produced 50 cucumbers per plant (at much higher densities than conventional nutrient feed systems). Conventional nutrient feed systems at this latitude have produced 25 cucumbers per plant over this period of time. Prior to mid-Feb., cucumber crops according to conventional nutrient feed technology do not produce and, by mid-Feb., such systems start to produce at a rate of about 5 to 8 cucumbers per plant per month.

Thus it is apparent that there has been provided in accordance with the invention a method and apparatus for environmental control of plant growth that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A controlled environment structure within which to grow horticultural plants comprising a base having a sloped floor;

a translucent heat-conductive stressed impermeable fabric shell mounted and supported on said base to sealingly enclose a predetermined spaced within which horticultural plants are to be grown against external environmental conditions;

temperature monitor and temperature control means for the space;

humidity monitor and humidity control means for the space;

carbon dioxide monitor and carbon dioxide control means for the space;

microprocessor control means electronically associated with the temperature monitor and control means, humidity monitor and carbon dioxide monitor and control means and programmed to provide optimum temperature, humidity and carbon dioxide conditions for the plants being cultivated in the space;

means for generating a mist cloud for evaporation within said shell and subsequent condensing on an interanl surface of said sehll to cool the structure; and means for collecting and recycling the condensate from said internal surface of said shell.

2. A structure according to claim 1 further comprising:

(a) plant root nutrient monitor means and plant root nutrient control means for plants grown within the space, the microprocessor control means also electronically associated with the plant root nutrient monitor and control means and programmed to provide optimum nutrient concentration conditions for nutrient solution being fed to the roots of the plants being cultivated in the space.

3. A structure according to claim 2 wherein the nutrient control means comprises a nutrient solution mixing tank, a nutrient source activated by the microprocessor control means to feed nutrient into the tank, and nutrient supply means to feed nutrient solution from the tank to the roots of the plants being cultivated.

4. A structure according to claim 2 further provided with alarm means to signal when temperature, humidity, plant root nutrient concentration, or carbon dioxide conditions in the space go beyond a predetermined range and cannot be returned by the respective corresponding control means.

5. A structure according to claim 2 wherein the shell has convex sides extending upwardly to a peak and wherein reflector means are provided outside of the shell to reflect solar radiation into the space.

6. A structure according to claim 2 wherein said temperature control means includes a heater means for heating the space.

7. A structure according to claim 1 wherein the fabric is technically woven polyvinyl chloride coated polyester scrim with about a 95% light translucency.

8. A structure according to claim 1 which further comprises spray means for controlled spraying of a film of water over the external surface of said shell to provide for condensation of water on an interior surface of said shell.

9. A structure according to claim 1 wherein the carbon dioxide control means comprises a carbon dioxide source activated by the microprocessor control means to feed required amounts of carbon dioxide to the space.

10. A structure according to claim 1 further provided with purification means for the air supplied to the space.

11. A structure according to claim 10 further provided with purification means for water supplied to the space.

12. A structure as set forth in claim 1 wherein said shell includes a plurality of rib members resting on said base and light translucent fabric tensioned between said ribs.

13. A method of plant husbandry which comprises:
growning plants in a sealed environment within a translucent stressed fabric shell mounted on a base, the environment within the space being sealed against external environmental air conditions;
controlling the temperature, humidity and carbon dioxide conditions within the space to ensure that optimum conditions for plant growth are maintained;
controlling the plant root nutrient and water conditions for optimum plant growth;
spraying a film of water over the shell to cool said shell; and
generating a cloud of vapor within the space for temperature and humidity control.

14. A method according to claim 13 including the step of providing adjacent the shell to enhance solar radiation entering the shell by reflection.

15. A method as set forth in claim 13 which further comprises the steps of spraying the film of water over the external surface of said shell to cool said shell and produce condensation on an inner surface of said shell, collecting condensed water from said inner surface of said shell and recycling the collected water.

16. A controlled environment structure for growing horticultural plants comprising:
a translucent stressed heat-conductive impermeable fabric shell disposed on a base to define a growing area sealed against external environmental air conditions;
a series of temperature monitors within said area;
a series of carbon dioxide monitors within said said area;
a plurality of temperature sensors in said shell;
an internal mist generation system in said area to generate a mist therein;
a carbon dioxide delivery system for supplying carbon dioxide to said area;
a nutrient delivery system for supplying nutrient solution to said area; and
a microprocessor electronically connected to said monitors, said sensors, said mist generation system an each said delivery system to control the delivery of carbon dioxide from said carbon dioxide delivery means to said area and to control the delivery of nutrient solution from said nutrient delivery means to said area in dependence upon the temperature, relative humidity and carbon dioxide content of the atmosphere in said area.

17. A structure as set forth in claim 16 further comprising collector means for collecting water condensing on an interior surface of said shell and means for recycling the collected water to said mist generation system.

18. A controlled environment structure within which to grow horticultural plants, comprising:
a translucent hat-conductive stressed impermeable fabric shell on a base, the shell and base enclosing a predetermined space within which horicultural plants are to be grown, the shell and base sealing the environment within the space against external environmental conditions;
temperature monitor and temperature control means for the space, said temperature control means comprising heater means and cooling means including mist generation means positioned within said shell above said base to produce a mist cloud over the plants and spray means for controlled spraying of a film of water over the external surface of said shell to provide for condensation of water on an interior surface of said shell;
humidity monitor and humidity control means for the space;
carbon dioxide monitor and carbon dioxide control means for the space; and
microprocessor control means electronically associated with the temperature monitor and control means, humidity monitor and control means and carbon dioxide monitor and control means and programmed to provide optimum temperature, humidity and carbon dioxide conditions for the plants being cultivated in the space.

19. A structure according to claim 18 further comprising collector means for water condensing on the interior surface of the shell and means to recycle the condensed water from the collector means to one of either the mist generation means or the plant root nutrient and water control means.

20. A structure according to claim 19 wherein the shell is elongated and has convex sides extending upwardly to a central peak along its elongated direction, the spray means being mounted to spray water in a film over the external surface and down both sides of the shell.

21. A structure according to claim 19 wherein the nutrient control means comprises a nutrient solution mixing tank, a nutrient source activated by the microprocessor control means to feed nutrient into the tank, and nutrient supply means to feed nutrient solution from the tank to the roots of the plants being cultivated, and wherein the water from the collector means is passed to the tank.

22. A structure according to claim 18 wherein the shell is elongated and has convex sides extending upwardly to a central peak along its elongated direction, the spray means being mounted to spray water in a film over the external surface and down both sides of the shell.

23. A controlled environment structure within which to grow horticultural plants comprising:
a base having a sloped floor;
a translucent heat-conductive stressed impermeable fabric shell mounted and supported on said base to sealingly enclose a predetermined spaced within which horticultural plants are to be grown against external environmental conditions;

temperature monitor and temperature control means for the space;
humidity monitor and humidity control means for the space;
carbon dioxide monitor and carbon dioxide control means for the space;
microprocessor control means electronically associated with the temperature monitor and control means, humidity monitor and carbon dioxide monitor and control means and programmed to provide optimum temperature, humidity and carbon dioxide conditons for the plants being cultivated in the space; and
cooling means for controlled spraying of water over an external surface of said shell to cool the structure.

24. A structure as set forth in claim 23 which further comprises at least one temperature sensor in said shell for sensing the temperature of said shell, said cooling means being responsive to said sensor sensing a predetermined temperature to cool said shell.

* * * * *